United States Patent
Ren et al.

(10) Patent No.: US 12,065,607 B1
(45) Date of Patent: Aug. 20, 2024

(54) THERMOCHROMIC SILICONE RUBBER COMPOSITE HEAT DISSIPATION PAD AND PREPARATION METHOD THEREOF

(71) Applicant: SICHUAN UNIVERSITY, Sichuan (CN)

(72) Inventors: Junwen Ren, Chengdu (CN); Zi Wang, Chengdu (CN); Shenli Jia, Chengdu (CN); Lihua Zhao, Chengdu (CN); Huachao Wei, Chengdu (CN); Lichuan Jia, Chengdu (CN); Guoqing Jiang, Chengdu (CN); Ruichi Zeng, Chengdu (CN)

(73) Assignee: SICHUAN UNIVERSITY, Chengdu (CN)

( * ) Notice: Subject to any disclaimer, the term of this patent is extended or adjusted under 35 U.S.C. 154(b) by 0 days.

(21) Appl. No.: 18/395,733

(22) Filed: Dec. 25, 2023

(30) Foreign Application Priority Data

Aug. 10, 2023 (CN) .......................... 202311001764.8

(51) Int. Cl.
   *C09K 5/14* (2006.01)
   *C08J 3/205* (2006.01)
   (Continued)

(52) U.S. Cl.
   CPC .............. *C09K 5/14* (2013.01); *C08J 3/2056* (2013.01); *C08K 9/02* (2013.01); *C08K 9/04* (2013.01);
   (Continued)

(58) Field of Classification Search
   CPC ...... C09K 5/14; C08K 3/38; C08K 2003/382; C08K 2003/385; C08K 9/02; C08K 9/04;
   (Continued)

(56) References Cited

U.S. PATENT DOCUMENTS

| 8,430,053 B2 * | 4/2013 | Taylor | ........................ G01K 3/04 |
| | | | 116/216 |
| 9,284,454 B2 * | 3/2016 | Delehanty | ............... C08L 83/04 |

(Continued)

FOREIGN PATENT DOCUMENTS

| CN | 105949895 A | * | 9/2016 | ........... C09D 101/18 |
| CN | 107501936 A | * | 12/2017 | .............. B01F 7/161 |

(Continued)

OTHER PUBLICATIONS

Zhang et al. ("Reversible thermochromic microencapsulated phase change materials for enhancing functionality of silicone rubber materials", Materials Chemistry and Physics 290, 2022, 126564) (Year: 2022).*

(Continued)

*Primary Examiner* — Matthew R Diaz
(74) *Attorney, Agent, or Firm* — PORUS IP LLC

(57) ABSTRACT

A silicone rubber composite heat dissipation pad and a preparation method thereof are provided. The method includes: dispersing hydroxyl-functionalized boron nitride nanosheet powder into deionized water, pouring it into a specialized container, pre-freezing it using liquid nitrogen, and then freeze-drying it to obtain a boron nitride nanosheet skeleton arranged in a horizontal direction; uniformly dispersing thermochromic nanoparticles in acetone to obtain a dispersion, mixing the dispersion with liquid silicone rubber and stirring until acetone is completely evaporated, then adding a curing agent to obtain a liquid silicone rubber pre-cure solution; pouring the liquid silicone rubber pre-cure solution into a container containing the boron nitride nanosheet skeleton, so that the liquid silicone rubber pre-cure solution is fully immersed in an interior of the boron nitride nanosheet skeleton; and then curing is carried out by elevating the temperature to obtain the heat dissipation pad.

7 Claims, 3 Drawing Sheets

(51) Int. Cl.
*C08K 3/38* (2006.01)
*C08K 9/02* (2006.01)
*C08K 9/04* (2006.01)
*C09C 3/00* (2006.01)
*C09C 3/04* (2006.01)
*C09C 3/08* (2006.01)
*C09K 9/00* (2006.01)

(52) U.S. Cl.
CPC ............. *C09C 3/006* (2013.01); *C09C 3/048* (2013.01); *C09C 3/08* (2013.01); *C09K 9/00* (2013.01); *C01P 2004/03* (2013.01); *C01P 2004/24* (2013.01); *C01P 2006/32* (2013.01); *C08J 2383/04* (2013.01); *C08K 2003/385* (2013.01); *C08K 2201/001* (2013.01); *C08K 2201/011* (2013.01)

(58) Field of Classification Search
CPC ......... C08K 2201/001; C08K 2201/011; C08J 3/2056; C08J 2383/04; C08L 83/04; C08L 83/06; C08L 83/08; C01P 2004/03; C01P 2004/24; C09C 3/006; C09C 3/048; C09C 3/08
See application file for complete search history.

(56) References Cited

U.S. PATENT DOCUMENTS

| | | | | |
|---|---|---|---|---|
| 9,745,499 | B2 * | 8/2017 | Hong | ................. C09K 5/14 |
| 11,746,235 | B2 * | 9/2023 | Moskal | ................. C08K 3/26 525/474 |
| 11,851,616 | B2 * | 12/2023 | Stefanakos | ............ C04B 28/04 |
| 2017/0190139 | A1 * | 7/2017 | Haghdoost | ................. B32B 3/18 |

FOREIGN PATENT DOCUMENTS

| | | | | |
|---|---|---|---|---|
| CN | 109777111 | A | | 5/2019 |
| CN | 112300536 | A | | 2/2021 |
| CN | 112519337 | A * | | 3/2021 ............ B32B 15/08 |
| CN | 113087971 | A | | 7/2021 |
| CN | 113105743 | A | | 7/2021 |
| CN | 113150544 | A | | 7/2021 |
| CN | 113201806 | A * | | 8/2021 |
| CN | 113861665 | A | | 12/2021 |
| CN | 114032071 | A | | 2/2022 |
| CN | 114395324 | A * | | 4/2022 |
| CN | 112175238 | B | | 5/2022 |
| CN | 115625938 | A | | 1/2023 |
| KR | 2018043544 | A * | | 4/2018 ......... C08G 73/1003 |
| KR | 20210048640 | A | | 5/2021 |
| WO | WO-9720324 | A1 * | | 6/1997 ............ C08K 3/24 |

OTHER PUBLICATIONS

Wang et al. ("A thermochromic, viscoelastic nacre-like nanocomposite for the smart thermal management of planar electronics", Nano-Micro Lett., 2023, 15, 170) (Year: 2023).*

Yang et al. ("Hexagonal boron nitride-induced lamellar-structured flexible phase change film for temperature-controlled information storage and wearable thermal regulation", Journal of Energy Storage 72, 2023, 108443) (Year: 2023).*

Notification to Grant Patent Right for Invention in Chinese Application No. 202311001764.8 mailed on Sep. 13, 2023, 11 pages.

Shen, Heng et al., Preparation of High Thermal Conductivity Boron Nitride/Silicone Rubber Composites by Ice Template Method, 2015 National Symposium on Polymer Academic Papers, 2015, 2 pages, Abstract only.

Zha, Junwei et al., Research Progress of Boron Nitride Modified Polymer Matrix Composites with High Thermal Conductivity, High Voltage Engineering, 49(9): 3625-3639, 2023, English abstract only.

Xia, Yanwei et al., Preparation and Properties of Epoxy Resin/ Functionalized Boron Nitride Nanosheets Composite Dielectric, Insulating Materials, 55(7): 27-33, 2022, English abstract only.

Xiang, Fangyu et al., Effects of Boron Nitride on Thermal Property and Mechanical Property of Silicone Rubber, Special Purpose Rubber Products, 42(3), 2021, 6 pages, English abstract only.

Khadija Kanwal Khanum et al., Enhanced Thermal Properties of Silicone Composites with Hexagonal Boron Nitride, 2020 IEEE Industry Applications Society Annual Meeting, 2020, 4 pages.

MD Rahinul Hasan Mazumder et al., Boron Nitride Based Polymer Nanocomposites for Heat Dissipation and Thermal Management Applications, Applied Materials Today, 29: 1-34, 2022.

Gao, Xiaohong et al., Research Progress on Preparation by Exfoliation method and Surface Modification of Boron nitride Nanosheets, China Powder Science and Technology, 29(1): 115-125, 2023, English Abstract Only.

* cited by examiner

THERMOCHROMIC SILICONE RUBBER COMPOSITE HEAT DISSIPATION PAD AND PREPARATION METHOD THEREOF

CROSS-REFERENCE TO RELATED APPLICATION

This application claims priority of Chinese Application No. 202311001764.8, filed on Aug. 10, 2023, the entire contents of each of which are hereby incorporated by reference.

TECHNICAL FIELD

The present disclosure generally relates to the field of battery thermal management technology, and particularly relates to a functionalized boron nitride thermochromic silicone rubber composite heat dissipation pad and its preparation method.

BACKGROUND

With the popularization of electric vehicles, wearable devices and mobile electronic products, battery thermal management technology has become increasingly important. Flexible polymers such as silicone rubber have excellent adhesion properties that enable them to be tightly adhere closely between a battery surface and a heat dissipation structure, ensuring effective heat transfer. In addition, the rubber matrix provides good processability to accommodate batteries of different shapes and sizes. However, polymeric materials have low intrinsic thermal conductivity, which limits their application in the field of battery thermal management. While doping modification technology can enhance the thermal conductivity of polymer (such as silicone rubber)-based flexible thermal management materials, the significant damage caused by excessive filler loading to their inherent excellent flexibility and plasticity has made it impossible to meet the industry's future demands for further development towards high power, high stability, and long lifespan in batteries. In addition, real-time monitoring of battery temperature is conducive to users and operation and maintenance personnel to correctly determine the operating status of the battery. Although infrared thermal imaging technology enables real-time and accurate monitoring of temperature distribution in battery packs during operation, its high cost prevents widespread application in the field of battery temperature monitoring. Therefore, there is an urgent need to develop flexible thermal management materials that have excellent comprehensive performance, are temperature sensitive and can provide feedback to battery temperature timely.

SUMMARY

To address the issues of poor flexibility and plasticity caused by excessive filler loading in current flexible thermal management materials, as well as the inability to provide temperature monitoring, the present disclosure provides a functionalized boron nitride thermochromic silicone rubber composite heat dissipation pad.

The present disclosure provides a method of preparing the functionalized boron nitride thermochromic silicone rubber composite heat dissipation pad, comprising the following steps.

S1: preparing boron nitride nanosheet powder. Step S1 includes the following sub-steps:

S11: adding micron-sized hexagonal boron nitride powder and lithium citrate to a mixture of deionized water and isopropyl alcohol, and magnetically stirring to obtain a hexagonal boron nitride dispersion.

S12: pouring the dispersion of step S11 into a quartz tube, obtaining a mixed dispersion containing boron nitride nanosheets by ultrasonication combined with a hydrothermal reaction, washing the mixed dispersion repeatedly using anhydrous ethanol and deionized water, obtaining the boron nitride nanosheets after vacuum drying, and then obtaining the boron nitride nanosheet powder after grinding the boron nitride nanosheets.

S2: grafting a hydroxyl group on a surface of the boron nitride nanosheet powder to produce hydroxyl-functionalized boron nitride nanosheet powder. The plasma power is 2000 W and the plasma treatment time is 30 min. The temperature of the plasma reaction chamber is room temperature, the gas atmosphere is air, and the through air flow rate is 500-800 sccm.

S3: dispersing the hydroxyl-functionalized boron nitride nanosheet powder into deionized water, stirring evenly, pouring it into a specialized container, using liquid nitrogen to pre-freeze for 50-70 s and then rapidly transferring the specialized container to a freeze dryer, freeze drying for 48 h at a temperature of −40° C., removing the specialized container from the freeze dryer and cooling the specialized container down to room temperature, and obtaining a boron nitride nanosheet skeleton arrayed in a horizontal direction.

The specialized container comprises a square polytetrafluoroethylene cassette having an upper opening and a side opening, wherein a slot is provided at an edge of the side opening, and a brass baffle plate is mounted in the slot to seal the side opening of the cassette, thereby forming a square container with only the upper opening. The square polytetrafluoroethylene cassette serves as a heat insulator, and the brass baffle provides a temperature gradient for directional freeze-drying.

S4: uniformly dispersing thermochromic nanoparticles in acetone to obtain a dispersion, mixing the dispersion with liquid silicone rubber and stirring until the acetone is completely evaporated, adding a silicone rubber curing agent to continue stirring evenly, and obtaining a liquid silicone rubber pre-cure solution.

S5: pouring the liquid silicone rubber pre-cure solution into a container containing the boron nitride nanosheet skeleton, placing the container in a vacuum environment, so that the liquid silicone rubber pre-cure solution is fully immersed in an interior of the boron nitride nanosheet skeleton while removing air bubbles.

S6: curing the liquid silicone rubber pre-cure solution containing the boron nitride nanosheet skeleton obtained in step S5 at elevated temperature under atmospheric pressure to obtain a flexible silicone rubber composite heat dissipation pad with functionalized boron nitride as a support and the thermochromic nanoparticles uniformly distributed inside.

In some embodiments, in step S11, the micron-sized hexagonal boron nitride powder has a particle size distribution of 5 to 10 μm, and a usage ratio of hexagonal boron nitride, lithium citrate, deionized water, and isopropyl alcohol is 1 g: 1 g: 25 mL:75 mL.

In some embodiments, in step S5, the air pressure of the vacuum environment is $10^{-4}$ Pa or less, and the boron nitride nanosheet skeleton is immersed in the liquid silicone rubber pre-cure solution for a duration of 4 h.

In some embodiments, in step S6, a temperature of the curing reaction is 120° ° C., and a duration of the curing reaction is 2 h.

In some embodiments, a weight ratio of the hydroxyl-functionalized boron nitride nanosheet powder to the liquid silicone rubber is (0.5-1.2): 10.

In some embodiments, the thermochromic nanoparticles are $CoO/TiO_2$ complexes. A weight ratio of the thermochromic nanoparticles to the liquid silicone rubber is 1:20.

The thermochromic nanoparticles are prepared by:
accurately weighing $TiO_2$ powder and CoO powder according to a molar ratio;
grinding the two types of powders in an agate mortar for 15 min, respectively; mixing the ground powders together and continuing grinding in the mortar for an additional 30 min to ensure a uniform mixture; placing the ground mixture in a muffle furnace and heating it up to 900-1200° C. at a heating rate of 5° C./min; maintaining the temperature for 2 h for calcination, and then allowing the furnace to cool down to room temperature. This process can yield $CoO/TiO_2$ composite nanoparticles.

Compared with the prior art, the present disclosure is beneficial in the following aspects:

(1) The present disclosure uses an ion intercalation-assisted liquid-phase exfoliation method to separate the hexagonal boron nitride into the boron nitride nanosheets, and the boron nitride nanosheets with a larger aspect ratio can provide longer and more efficient pathways for phonon transfer. Through plasma treatment, the hydroxyl groups are grafted on the surface of the boron nitride nanosheets, which improves their dispersion in aqueous solution and resulted in a more uniform distribution of the boron nitride skeleton. Compared with traditional doping blending, the thermally conductive skeleton constructed by directional freeze-drying provides a clear pathway for heat transfer, which makes full use of the ultra-high thermal conductivity of the boron nitride nanosheets in the horizontal direction, and achieves a significant increase in the thermal conductivity of the composite material at a low filler loading. In addition, due to the low filler loading, the composite material maintains the excellent flexibility and processability of the silicone rubber matrix, which fully meets the application requirements of battery thermal management.

(2) With the utilization of thermochromic nanoparticles, the battery pack achieves overheating self-diagnosis as these particles visually manifest temperature variations by changing colors. This enables customers and operation and maintenance personnel to swiftly assess the heating status of the battery pack through visual observation. Compared with traditional infrared thermal imaging, it not only greatly reduces the cost of the equipment, and does not require the construction of a complex monitoring platform, which is very suitable for wide application in the field of battery temperature monitoring.

Other advantages, objects and features of the present disclosure will be reflected partly by the following description, and partly will be understood by those skilled in the art through the study and practice of the present disclosure.

BRIEF DESCRIPTION OF THE DRAWINGS

The present disclosure is further described in terms of exemplary embodiments. These exemplary embodiments are described in detail with reference to the drawings. It should be noted that the drawings are not to scale. These embodiments are non-limiting exemplary embodiments, in which like reference numerals represent similar structures throughout the several views of the drawings.

Figure 1:
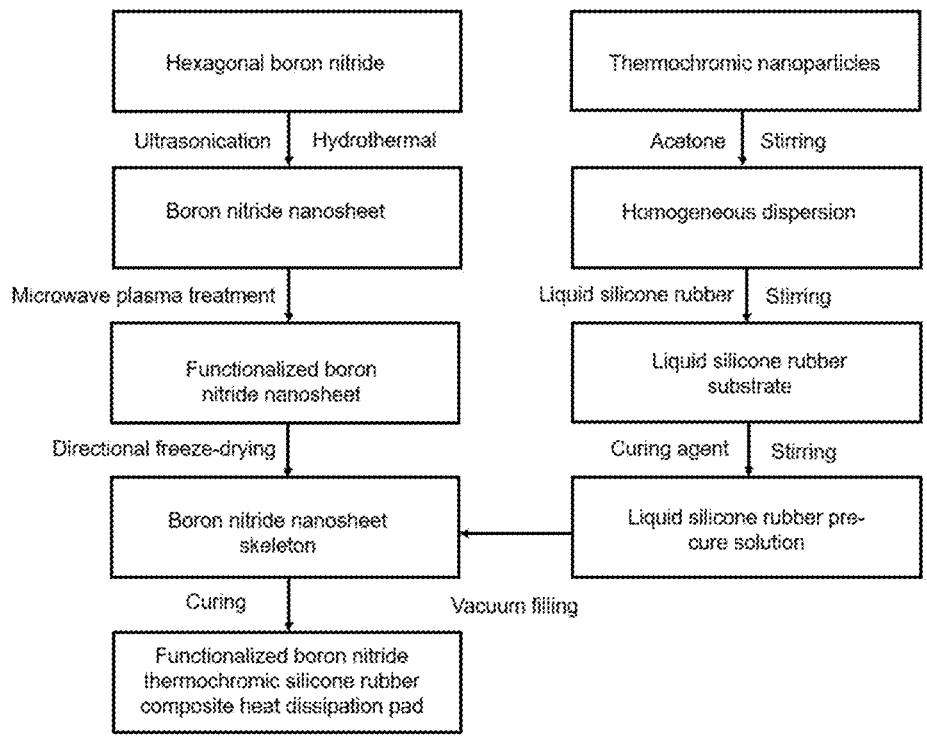
FIG. 1 shows a flow chart of a process of preparing a functionalized boron nitride thermochromic silicone rubber composite heat dissipation pad according to some embodiments of the present disclosure.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

DETAILED DESCRIPTION

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is to describe particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawing(s), all of which form a part of this specification. It is to be expressly understood, however, that the drawing(s) is for the purpose of illustration and description only and are not intended to limit the scope of the present disclosure. It is understood that the drawings are not to scale.

A heat dissipation pad is provided. The heat dissipation pad is prepared based on boron nitride, silicone rubber, and thermochromic nanoparticles. In some embodiments, the boron nitride may be boron nitride nanosheet powder. Further, the boron nitride nanosheet powder may be functionalized, e.g., hydroxyl-functionalized. In some embodiments, the silicone rubber and thermochromic nanoparticles may be mixed. For example, the liquid silicone rubber may be mixed with a dispersion of thermochromic nanoparticles in acetone, and a silicone rubber curing agent is added to obtain a liquid silicone rubber pre-cure solution. In some embodiments, the silicone rubber curing agent may include, for example, organic peroxides, platinum-based catalysts. The liquid silicone rubber pre-cure solution may be immersed in a boron nitride nanosheet skeleton which is obtained from the boron nitride nanosheet powder, so as to obtain the flexible silicone rubber composite heat dissipation pad.

In some embodiments, a weight ratio of the hydroxyl-functionalized boron nitride nanosheet powder to the liquid silicone rubber may be (0.1-1.5): 10, (0.2-1.4):10, (0.3-1.3): 10, (0.4-1.3):10, or (0.5-1.2): 10.

In some embodiments, a weight ratio of the thermochromic nanoparticles to the liquid silicone rubber is (0.5-2):20, (0.8-1.5):20, or (0.9-1.2):20. In some embodiments, a weight ratio of the thermochromic nanoparticles to the liquid silicone rubber is 1:20.

Example 1 A Process of Preparing a Functionalized Boron Nitride Thermochromic Silicone Rubber Composite Heat Dissipation Pad Step 1: 1 g of hexagonal boron nitride and 1 g of lithium citrate were added to a mixture of 100 mL of deionized water and isopropyl alcohol (a volume ratio of water:isopropyl alcohol is 1:3), and stirred under a sealed condition at a rotational speed of 1000-1200 rpm for 30 min at room temperature; the mixed dispersion was poured into a quartz tube, and ultrasonically dispersed in an ultrasonic dispersing apparatus at a power of 400 W and a frequency of 40 KHz for 6 h of ultrasonic treatment, and then the treated dispersion was transferred to a hydrothermal reactor for the hydrothermal reaction at a temperature of 180 °C for 6 h. After the completion of the reaction, the hydrothermal reactor was cooled down to room temperature, and the mixed dispersion containing boron nitride nanosheets was obtained;

The mixed dispersion containing the boron nitride nanosheets was washed three times each with anhydrous ethanol and deionized water by vacuum filtration, and then the filter paper and the filter cake were put into a clean beaker, and then dried under vacuum at 60° C. in a vacuum oven for 48 h to remove the internal water. The dried boron nitride nanosheets filter cake is ground with metal balls in a grinding bowl to form a powder, ensuring uniform distribution without noticeable aggregation and agglomeration.

Step 2: The boron nitride nanosheet powder was placed into a plasma reaction chamber, air was passed into the reaction chamber at a flow rate of 500-800 sccm, and the surface treatment was carried out on the boron nitride nanosheets by using microwave plasma at a power of 2000 W for 30 min, to obtain functionalized boron nitride nanosheet powder with hydroxyl groups grafted on the surface.

Figure 2:
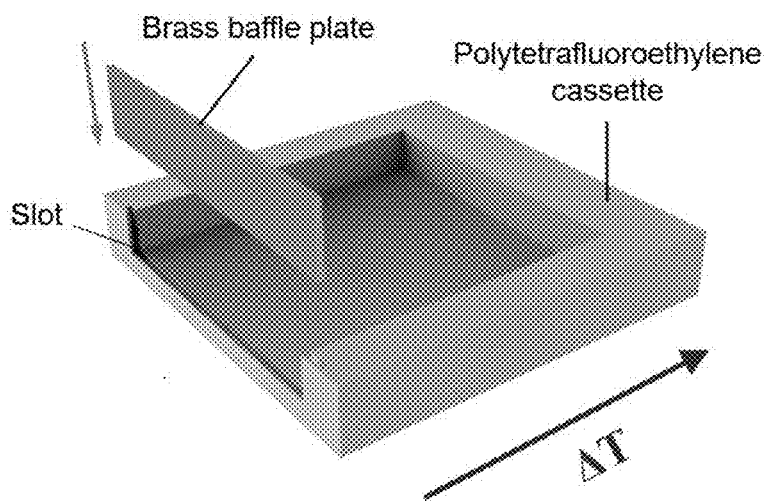
FIG. 2 shows a schematic diagram of a structure of a specialized container according to some embodiments of the present disclosure.
Figure 3:
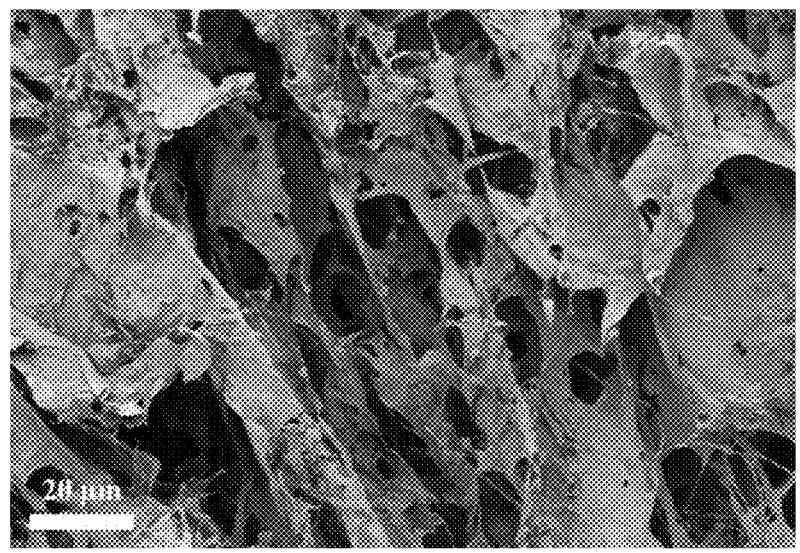
FIG. 3 shows a scanning electron microscope (SEM) image of a thermally conductive boron nitride nanosheet skeleton obtained in Example 1 of the present disclosure.

Step 3: 0.58 g of a hydroxyl-functionalized boron nitride nanosheet powder was dispersed into 10 mL of deionized water, magnetically stirred under a closed condition at a speed of 1000-1200 rpm for 15 min, and a dispersion was poured into a specialized container shown in FIG. 2, and pre-frozen was applied using liquid nitrogen for 60 s. Subsequently, the container was rapidly transferred to a freeze dryer, and freeze-dried at −40° C. for 48 h, a boron nitride nanosheet skeleton arranged in a horizontal direction was obtained, and its microstructure is shown in FIG. 3. As shown in the figure, it can be observed that the boron nitride nanosheets are orderly arranged along a temperature gradient direction with good contact, providing an efficient pathway for the transfer of phonons in the in-plane direction.

Step 4: 0.5 g of thermochromic nanoparticles was added to 15 mL of acetone and stirred under an airtight condition at 800-1000 rpm for 30 min, followed by 15 min of ultrasonication in an ultrasonic cleaner at a power of 200 W. A homogeneously dispersed mixture of thermochromic nanoparticles and acetone was obtained. The mixture was mixed with 10 g of liquid silicone rubber, and mechanical stirring was carried out at a rotational speed of 300-400 rpm until the acetone was completely evaporated by odor determination, so as to obtain a liquid silicone rubber substrate; subsequently, 1 g of silicone rubber curing agent was added to the silicone rubber substrate and continued to be stirred for 30 min, so as to homogeneously mix all components in the mixture, thereby obtaining a liquid silicone rubber pre-cure solution. The liquid silicone rubber and silicone rubber curing agent were purchased in pairs.

Step 5: The liquid silicone rubber pre-cure solution was poured into a container containing the boron nitride nanosheet skeleton, and then quickly transferred the container to a vacuum oven, reduced the air pressure to below $10^{-4}$ Pa at room temperature, and maintained it for 4 h, so that the air bubbles in the liquid silicone rubber was completely removed, and at the same time, the liquid silicone rubber pre-cure solution was fully immersed in an interior of the boron nitride nanosheet skeleton.

Figure 4:
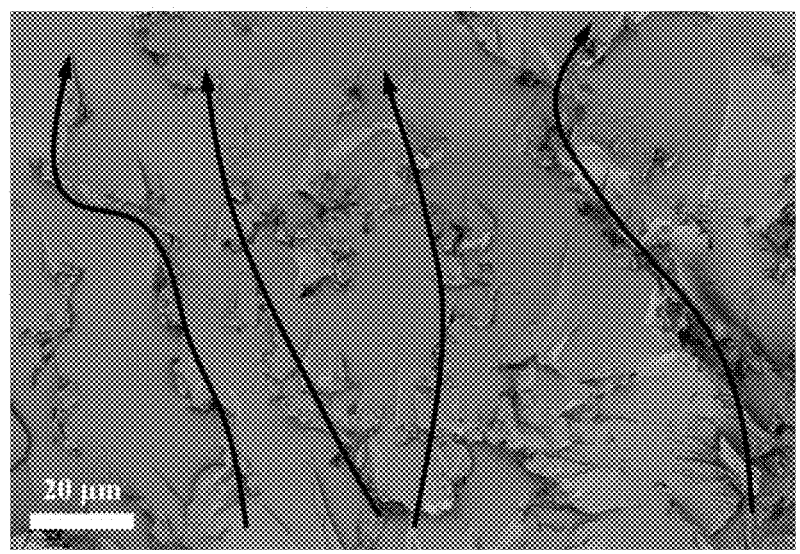
FIG. 4 shows a scanning electron microscope (SEM) image of a cross-section of a thermochromic silicone rubber composite heat dissipation pad obtained in Example 1 of the present disclosure.

Step 6: At atmospheric pressure, the liquid silicone rubber pre-cure solution containing the boron nitride nanosheet skeleton obtained in step 5 was subjected to curing temperature elevation. The curing temperature was 120° C., and the curing reaction time was 2 h. After completion of the reaction, the sample was cooled to room temperature in the furnace, thus obtaining a flexible silicone rubber composite heat dissipation pad. This pad exhibited a uniform internal distribution of the thermochromic nanoparticles and a boron nitride nanosheet skeleton volume fraction of 2.5 vol %. The microstructure after embrittlement caused by liquid nitrogen cooling is shown in FIG. 4. From the figure, it could be observed that during the curing process, the freeze-dried skeleton maintained a well-defined morphology without being damaged. Compared with traditional doping blending, this process greatly improved the contact between the thermally conductive fillers and reducing the overall interface thermal resistance of the material. In addition, the ordered arrangement provided a more clearer pathway for heat transfer, thus realizing a significant increase in the thermal conductivity of the composite material at a low filler loading.

Example 2

A composite heat dissipation pad prepared by a process of Example 2 is similar to that of Example 1, with the only difference being that a weight of the functionalized boron nitride nanosheet powder added in a step of directional freeze-drying in Step 3 is 1.16 g. This resulted in a volume fraction of 5 vol % for the boron nitride nanosheet skeleton in the prepared composite heat dissipation pad.

Comparative Example 1 Heat Dissipation Pad Prepared Using Pure Silicone Rubber

Step 1: 1 g of a silicone rubber curing agent was mixed with 10 g of liquid silicone rubber, and mechanically stirred at 300-400 rpm for 30 min, so that the two components were uniformly mixed to obtain a liquid silicone rubber pre-cure solution.

Step 2: The liquid silicone rubber pre-cure solution obtained in Step 1 was poured into a container designed for directional freeze-drying. Subsequently, the container was quickly transferred to a vacuum oven, where the air pressure was reduced to below $10^{-4}$ Pa, and maintained for 2 h, allowing for the thorough removal of internal bubbles.

Step 3: The liquid silicone rubber pre-cure solution was cured at elevated temperatures under atmospheric pressure, with a curing temperature of 120° C. and a curing reaction time of 2 h. Upon completion of the reaction, the sample was cooled to room temperature to obtain a pure silicone rubber heat dissipation pad.

Comparative Example 2 Heat Dissipation Pad Prepared by a Conventional Process

A silicone rubber composite heat dissipation pad with a boron nitride content of 5 vol % was prepared by a conventional process as follows:

The hydroxyl-functionalized boron nitride nanosheet powder was prepared according to steps 1 and 2 of Example 1.

The subsequent process was as follows:

a. 1.16 g of hydroxyl-functionalized boron nitride nanosheet powder was added to 15 mL of acetone and stirred under a closed condition at 800-1000 rpm for 30 min, followed by ultrasonic treatment in an ultrasonic cleaner at a power of 200 W for 15 min to obtain a homogeneously dispersed mixture of boron nitride nanosheets with acetone;

b. The mixture was mixed with 10 g of liquid silicone rubber, and mechanical stirring was carried out at a rotational speed of 300-400 rpm until the acetone was completely evaporated by odor determination, so as to obtain a liquid silicone rubber substrate; subsequently, 1 g of silicone rubber curing agent was added to the silicone rubber substrate and continued to be stirred for 30 min, so as to homogeneously mix all components in the mixture, thereby obtaining a liquid silicone rubber pre-cure solution;

c. The liquid silicone rubber pre-cure solution was poured into the container used for directional freeze-drying, and then the container was quickly transferred to a vacuum oven, where the air pressure was reduced to below $10^{-4}$ Pa, and maintained for 2 h, allowing for the thorough removal of internal bubbles. The liquid silicone rubber pre-cure solution was cured at elevated temperatures under atmospheric pressure, with a curing temperature of 120° C. and a curing reaction time of 2 h. After the reaction was completed, the sample was cooled to room temperature in the furnace to obtain a rubber composite heat dissipation pad with a boron nitride nanosheet content of 5 vol %.

Figure 5:
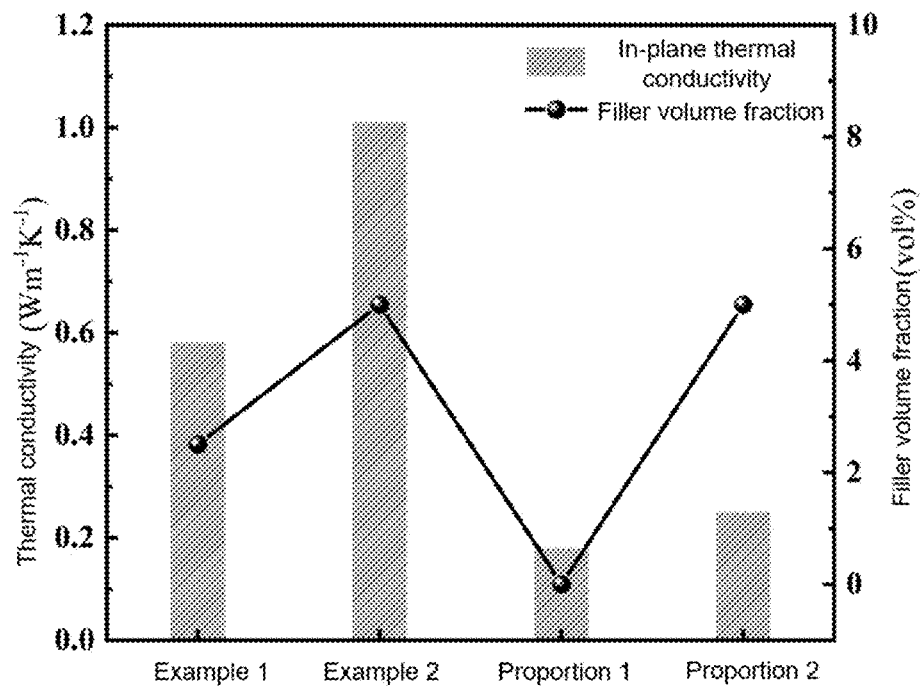
FIG. 5 shows a graph comparing the thermal conductivity of heat dissipation pads of Examples 1, 2 and the Comparative Examples 1, 2 of the present disclosure.

The heat dissipation pads prepared by Examples 1, 2 and Comparative Examples 1, 2 was tested for thermal conductivity by using the laser method, and the results are shown in FIG. 5. It could be seen that the thermal conductivity of the heat dissipation pads prepared in Examples 1 and 2 of the present disclosure are significantly better than that of Comparative Examples 1 and 2. That is, the silicone rubber-based heat dissipation pad by using the process of the present disclosure achieves a significant improvement in the thermal conductivity by using a very small amount of boron nitride.

Figure 6:
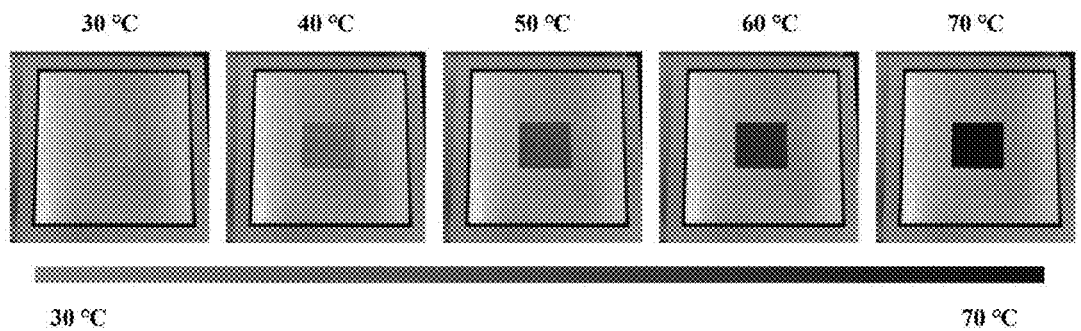
FIG. 6 shows an image which displays the color change of a functionalized boron nitride thermochromic silicone rubber composite heat dissipation pad obtained from Example 1 of the present disclosure at different temperatures.

The color change of the heat dissipation pads prepared in Example 1 at different temperatures was recorded, and the results are shown in FIG. 6, which shows that the heat dissipation pad is extremely sensitive to temperature change, and can provide accurate temperature information through its color.

In summary, the preparation method of the functionalized boron nitride thermochromic silicone rubber composite heat dissipation pad provided by the present disclosure utilizes directional freeze-drying to directionally arrange functionalized boron nitride nanosheets, and builds a thermally conductive skeleton inside the material. Unlike the traditional doping blending, the thermally conductive skeleton provided by the present disclosure constructs an extremely clear and efficient pathway for heat transfer, overcomes the problem of phonon scattering at the interface easily caused by poor contact between fillers, and greatly reduces the interfacial thermal resistance, thereby realizing a significant increase in the thermal conductivity of the composite material. In addition, due to the low loading of fillers and the limited introduction of defects within the composite material, the material retains the inherent high flexibility and processability of silicone rubber. The heat dissipation pad provided by the present disclosure is fully capable of meeting the thermal management requirements of batteries and power electronic devices of various sizes and shapes. On this basis, the present disclosure introduces thermochromic nanoparticles that are sensitive to temperature changes and can reflect temperature variations through color changes. This allows users and maintenance personnel to visually assess the heating status of the battery during operation, eliminating the need for expensive and complex temperature monitoring platforms. This feature opens up broad application prospects.

The above description is only a better embodiment of the present disclosure, and is not a formal limitation, although the present disclosure has been disclosed as a better embodiment, but is not used to limit the present disclosure. Any skilled person in this field, within the scope of the technical solution of the present disclosure, can make slight alterations or modifications as equivalent variations using the disclosed technical content above. Any simple modifications, equivalent variations, or modifications made to the above embodiments, within the technical essence of the present disclosure and not departing from the technical solution of the present disclosure, are still within the scope of the technical solution of the present disclosure.

We claim:

1. A method for preparing a silicone rubber composite heat dissipation pad, comprising:
   S1: preparing boron nitride nanosheet powder;
   S2: grafting a hydroxyl group on a surface of the boron nitride nanosheet powder to produce hydroxyl-functionalized boron nitride nanosheet powder;
   S3: dispersing the hydroxyl-functionalized boron nitride nanosheet powder into deionized water, stirring evenly, pouring it into a specialized container,
   wherein the specialized container comprises a square polytetrafluoroethylene cassette having an upper opening and a side opening, wherein a slot is provided at an edge of the side opening, and a brass baffle plate is mounted in the slot to seal the side opening of the cassette, thereby forming a square container with only the upper opening, using liquid nitrogen to pre-freeze for 50-70 s and then transferring the specialized container to a freeze dryer, freeze-drying for 48 h at a temperature of −40° C., removing the specialized container from the freeze dryer to warm up the specialized container to room temperature, and obtaining a boron nitride nanosheet skeleton arrayed in a horizontal direction;

S4: uniformly dispersing thermochromic nanoparticles in acetone to obtain a dispersion, mixing the dispersion with liquid silicone rubber and stirring until the acetone is completely evaporated, adding a silicone rubber curing agent to continue stirring evenly, and obtaining a liquid silicone rubber pre-cure solution;

S5: pouring the liquid silicone rubber pre-cure solution into a container containing the boron nitride nanosheet skeleton, placing the container in a vacuum environment, so that the liquid silicone rubber pre-cure solution is fully immersed in an interior of the boron nitride nanosheet skeleton while removing air bubbles; and S6: curing the liquid silicone rubber pre-cure solution containing the boron nitride nanosheet skeleton obtained in step S5 at elevated temperature under atmospheric pressure to obtain a flexible silicone rubber composite heat dissipation pad with functionalized boron nitride as a support and the thermochromic nanoparticles uniformly distributed inside.

2. The method of claim 1, wherein in step S5, an air pressure of the vacuum environment is less than $10^{-4}$ Pa, and a duration of immersion of the liquid silicone rubber pre-cure solution in the boron nitride nanosheet skeleton is 4 h.

3. The method of claim 2, wherein in step S6, a temperature of the curing reaction is 120° C., and a duration of the curing reaction is 2 h.

4. The method of claim 1, wherein step S1 comprises the following sub-steps:
   S11: adding micron-sized hexagonal boron nitride powder and lithium citrate to a mixture of deionized water and isopropyl alcohol, and magnetically stirring to obtain a hexagonal boron nitride dispersion; and
   S12: pouring the dispersion of step S11 into a quartz tube, obtaining a mixed dispersion containing boron nitride nanosheets by ultrasonication combined with a hydrothermal reaction, washing the mixed dispersion repeatedly using anhydrous ethanol and deionized water, obtaining the boron nitride nanosheets after vacuum drying, and then obtaining the boron nitride nanosheet powder after grinding the boron nitride nanosheets.

5. The method of claim 4, wherein in step S2, the boron nitride nanosheet powder is subjected to microwave plasma treatment to graft the hydroxyl group onto the surface, so as to obtain the hydroxyl-functionalized boron nitride nanosheet powder.

6. The method of claim 1, wherein the thermochromic nanoparticles are $CoO/TiO_2$ complexes.

7. The method of claim 6, wherein a weight ratio of the thermochromic nanoparticles to the liquid silicone rubber is 1:20.

* * * * *